(12) United States Patent
Wang et al.

(10) Patent No.: US 8,897,156 B2
(45) Date of Patent: Nov. 25, 2014

(54) METHOD AND APPARATUS FOR UPLINK SYNCHRONIZATION CONTROL

(75) Inventors: Zhixue Wang, Beijing (CN); Guoqing Li, Beijing (CN); Yi Zhao, Beijing (CN); Jiamin Liu, Beijing (CN); Yali Zhao, Beijing (CN); Fangli Xu, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 188 days.

(21) Appl. No.: 13/320,537

(22) PCT Filed: May 11, 2010

(86) PCT No.: PCT/CN2010/072621
§ 371 (c)(1),
(2), (4) Date: Nov. 14, 2011

(87) PCT Pub. No.: WO2010/130196
PCT Pub. Date: Nov. 18, 2010

(65) Prior Publication Data
US 2012/0063425 A1    Mar. 15, 2012

(30) Foreign Application Priority Data

May 11, 2009  (CN) .......................... 2009 1 0083788
Nov. 2, 2009  (CN) .......................... 2009 1 0207933

(51) Int. Cl.
*H04J 3/14*  (2006.01)
*H04J 3/06*  (2006.01)
(52) U.S. Cl.
USPC ............................ 370/252; 370/350; 370/503
(58) Field of Classification Search
USPC .................................. 370/252, 328, 350, 503
See application file for complete search history.

(56) References Cited

U.S. PATENT DOCUMENTS

2010/0061361 A1* 3/2010 Wu .............................. 370/350
(Continued)

FOREIGN PATENT DOCUMENTS

CN           101388722           3/2009
(Continued)

OTHER PUBLICATIONS

3rd Generation Partnership Project; Technical Specification Group Radio Access Network; Evolved Universal Terrestrial Radio Access (E-UTRA) Medium Access Control (MAC) protocol specification (Release 8) (2008).

(Continued)

*Primary Examiner* — Andrew Lee
(74) *Attorney, Agent, or Firm* — Marshall, Gerstein & Borun LLP

(57) ABSTRACT

The present invention discloses a method for uplink synchronization control, wherein network side and a user equipment (UE) maintain a timing alignment timer (TAT) for the UE, and maintain an uplink transmission timing adjustment amount for uplink component carriers, and the method includes following steps: the network side measuring uplink component carriers of the UE, and obtaining an uplink transmission TA amount of the uplink component carriers; and before the TAT expires, the network side transmitting to the UE an adjustment command comprising information of the uplink transmission TA amount for at least one of the uplink component carriers of the UE. Also disclosed in the embodiments of the present invention are a method for uplink synchronization control at the UE side, and a base station and a UE for implementing the above methods. The solution of the present invention enables accurate adjustment of the uplink synchronization for each component carrier in a carrier aggregation mechanism.

20 Claims, 6 Drawing Sheets

(56) References Cited

U.S. PATENT DOCUMENTS

| | | | | |
|---|---|---|---|---|
| 2011/0120821 A1* | 5/2011 | Shimamura | ............ | 188/234 |
| 2012/0099577 A1* | 4/2012 | Baldemair et al. | ............ | 370/338 |
| 2012/0120821 A1* | 5/2012 | Kazmi et al. | ............ | 370/252 |
| 2012/0147873 A1* | 6/2012 | Cheng et al. | ............ | 370/338 |
| 2012/0218987 A1* | 8/2012 | Zhao et al. | ............ | 370/350 |
| 2012/0243514 A1* | 9/2012 | Wu | ............ | 370/336 |
| 2013/0028239 A1* | 1/2013 | Dinan | ............ | 370/336 |
| 2013/0114576 A1* | 5/2013 | Kwon et al. | ............ | 370/336 |
| 2013/0142106 A1* | 6/2013 | Zhang et al. | ............ | 370/315 |

FOREIGN PATENT DOCUMENTS

| | | |
|---|---|---|
| CN | 101404526 | 4/2009 |
| EP | 2 230 870 A1 | 9/2010 |
| WO | WO-2009/088204 A2 | 7/2009 |

OTHER PUBLICATIONS

Ericsson, "Impact of Carrier Aggregation on the L2 Protocol Architecture for LTE Rel-10," 3GPP Draft; R2-092957 L2 Protocol Architecture for LTE REL-10, 3rd Generation Partnership Project (3GPP), Mobile Competence Centre (2009).

Parkvall et al., "LTE-Advanced—Evolving LTE Towards IMT-Advanced," Ericsson Research (2008).

Samsung, "Handling Uplink Transmission Timing," 3GPP Draft: R2-090546 Handling Uplink Transmission Timing, 3rd Generation Partnership Project (3GPP), Mobile Competence Centre (2009).

Decision of Rejection for Chinese Application No. 200910207933.7, dated Jan. 6, 2013.

Extended European Search Report for Application No. 10774537.4, dated Dec. 19, 2012.

First Office Action for Chinese Application No. 200910207933.7, dated Jun. 5, 2012.

* cited by examiner

METHOD AND APPARATUS FOR UPLINK SYNCHRONIZATION CONTROL

TECHNICAL FIELD

This invention relates to mobile communication technology, and more particularly related to a method and apparatus for uplink synchronization control.

BACKGROUND OF THE INVENTION

In a 3GPP LTE-Advanced system (LTE is the abbreviation of Long Term Evolution, and is an evolution system of the third generation mobile communication system, an LTE-Advanced system is an advanced version of LTE system, abbreviated as LTE-A), the peak rate is greatly improved compared with that of the LTE system. The downlink peak rate is required to reach 1 Gbps, and the uplink peak rate is required to reach 500 Mbps. At the same time, the LTE-A system is required to have a very good compatibility with the LTE system. Based on needs of improving the peak rate, the compatibility with the LTE system and making full use of spectrum resources, the LTE-A system introduces a carrier aggregation (CA) technology.

The carrier aggregation technology means that the uplink and downlink in a cell respectively contain multiple component carriers rather than the mode of having only a carrier in the LTE and earlier wireless communication systems. In a CA system, each component carrier can be continuous or discontinuous. In order to be compatible with the LTE system, the maximum bandwidth of each component carrier is 20 MHz, and the bandwidths of different component carriers can be identical or different.

With respect to a transmission technology of single carrier frequency division multiple access (SC-FDMA), in order to maintain orthogonality between uplink signals of different user equipments (UE), it should be ensured that receiving clocks of the signals of various UEs at the receiver side are the same. The base station instructs the UE to adopt different uplink timing advance through uplink time synchronization adjustment signaling, to make up propagation delay of the uplink signal, so that signals of the UEs located at different locations in the cell can reach the base station substantially at the same time.

The LTE uses timer-based uplink synchronization maintenance mechanism, a configurable timing alignment timer (TAT) and an uplink timing adjustment command (TA Command, TAC) are maintained for each UE. After the UE establishes a connection, the TAT is maintained for the UE and the base station. Before the TAT expires, the base station sends to the UE an uplink timing adjustment command. If the UE receives the uplink timing adjustment command, then the UE adjusts the uplink transmission time according to TA (Timing Advance) parameters; if the UE does not receives the uplink timing adjustment command before the timer expires, then the UE may consider that uplink transmission loses synchronization. The purpose of the uplink synchronization maintenance is to ensure that through reasonably configuration and maintenance of the TAT, the UE and the base station is enabled to try their best to make the TAT not expire so as to keep the uplink synchronization between the UE and the base station, and is also to try to send less TACs and reduce control signaling on the uplink and the downlink for uplink synchronization.

SUMMARY OF THE INVENTION

A method for uplink synchronization control provided in an embodiment of the invention includes that:

network side and a user equipment (UE) maintain a timing alignment timer (TAT) for the UE, and maintain an uplink transmission timing adjustment amount for uplink component carriers, and the method includes:

the network side measuring uplink component carriers of the UE, and obtaining an uplink transmission timing adjustment amount of the uplink component carriers; and before the TAT expires, the network side transmitting to the UE a timing adjustment command including information of the uplink transmission timing adjustment amount for at least one of the uplink component carriers of the UE.

Another method for uplink synchronization control provided in an embodiment of the invention includes that:

network side and a user equipment (UE) maintain a timing alignment timer (TAT) for the UE, and maintain an uplink transmission timing adjustment amount for uplink component carriers, and the method includes:

when the UE receives a timing adjustment command before the TAT expires, the UE instructing a physical layer to implement uplink transmission timing adjustment according to the uplink transmission timing adjustment amount for the uplink component carriers included in the timing adjustment command, and resetting the TAT when a predetermined condition is satisfied.

A base station provided in an embodiment of the invention includes:

a measurement module, to respectively measure uplink component carriers of a user equipment (UE) to obtain uplink transmission timing adjustment amount of the uplink component carriers;

a timer module, to maintain a timing alignment timer (TAT) for the UE; and an adjustment command module, to generate a timing adjustment command which includes the uplink transmission timing adjustment amount of the uplink component carriers obtained by the measurement module through measurement before the TAT maintained by the timer module expires, and to send the timing adjustment command to the UE.

User equipment provided in an embodiment of the invention includes:

a receiving module, to receive a timing adjustment command;

a timer module, to maintain a timing alignment timer (TAT), start or restart the TAT when the receiving module receives the timing adjustment command; and an uplink adjustment module, to instruct a physical layer to implement uplink transmission timing adjustment according to the uplink transmission timing adjustment amount for the uplink component carriers comprised in the timing adjustment command when the receiving module receives the timing adjustment command before the TAT of the timer module expires.

It can be seen from the above technical solutions that, the present invention maintains the TAT for the UE so as to effectively reduce complexity of the UE's processing. At the same time, the UE and the network side indicate the uplink transmission timing adjustment amount for each uplink component carrier, and this can enable accurate adjustment of the uplink synchronization for each component carrier in a carrier aggregation mechanism.

EMBODIMENTS OF THE INVENTION

In order to make objects, technical solutions and advantages of the invention clear, the present invention is hereinafter further explained in details with reference to embodiments and drawings.

Figure 1:
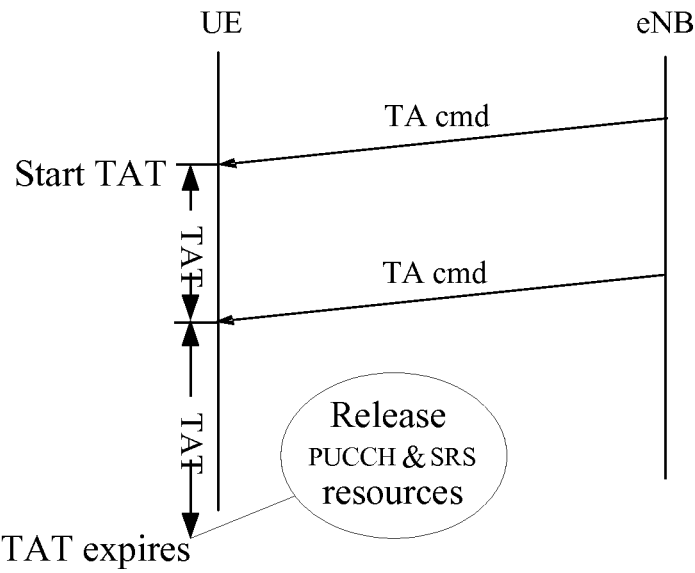
FIG. 1 is a flow chart of uplink synchronization maintenance in an example.

A flow chart of uplink synchronization maintenance in the prior art an example is shown in FIG. 1, and the basic process is as follows:

Step 101: a base station (eNB) is in charge of uplink synchronization control, and sends a TAC to each UE, using one-step correction with a granularity of 0.52 us. The TAC is sent through a media access control protocol data unit (MAC PDU).

Step 102: the UE uses a timer configured by the eNB to determine whether the UE loses synchronization, and the UE is allowed to lose synchronization in a connection state.

Step 103: when the UE receives the TAC, if the TAT does not work, the UE starts the TAT; if the TAT has worked, the UE restarted the TAT; and then the UE applies the TA of the TAC.

Step 104: when the TAT expires, the UE initiates a random access to achieve uplink synchronization before uplink transmission, and releases physical uplink control channel (PUCCH) resources and pilot signalSounding Reference Symbol (SRS) resources.

An important feature of the LTE-A system is that the UE can work on a plurality of uplink component carriers. If the uplink synchronization control mechanism of the LTE is directly applied in the LTE-A system, it is needed to maintain a TAT and a TAC for each uplink component carrier. The eNB respectively sends an uplink timing adjustment command for each uplink component carrier before the TAT expires, and the UE needs to maintain a plurality of TATs at the same time, so the implementation is of a very high complexity. If the LTE-A system only maintains a TAT and a TAC, it is impossible to accurately adjusting uplink transmission time for different carriers by averaging the uplink TAs of various uplink component carriers.

The technical solution provided in an example of the invention includes that: the network side and a user equipment (UE) maintain a timing alignment timer (TAT) for the UE, and maintain an uplink transmission timing adjustment amount for uplink component carriers. And the example further includes the following steps that:

the network side measures the uplink component carriers of the UE, and obtains the uplink transmission timing adjustment amount for the uplink component carriers;

before the TAT expires, the network side transmits to the UE an adjustment command which includes information of uplink transmission timing adjustment amount for at least one of the uplink component carriers of the UE.

Figure 2:
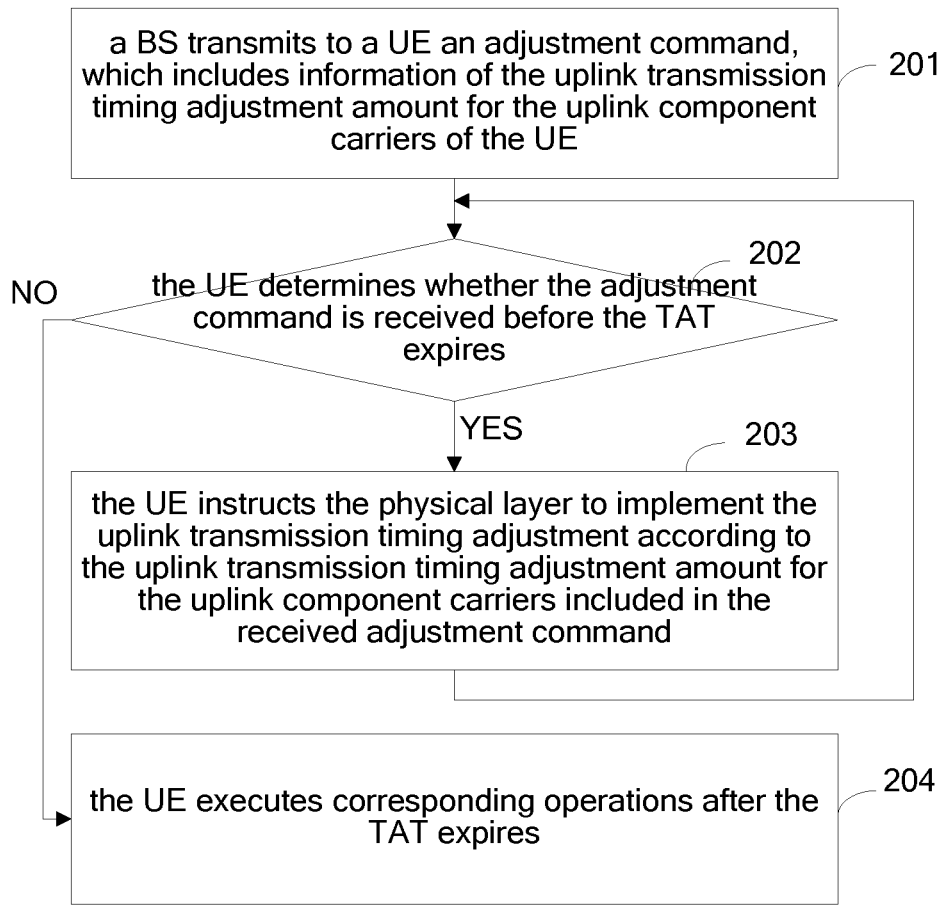
FIG. 2 is a flow chart of uplink time synchronization maintenance of a base station and a UE in an example of the invention.

An uplink time synchronization maintenance procedure between a base station and UE in the invention is shown in FIG. 2, and includes the following steps:

Step 201: a base station transmits to a UE an adjustment command which includes information of uplink transmission timing adjustment amount for uplink component carriers of the UE.

In this step, operations executed at the network side include but not limited to, transmitting the adjustment command on at least one of downlink component carriers corresponding to the uplink component carriers. It may also specifically include that:

the network side, for each uplink component carrier, transmits an adjustment command on the downlink component carrier corresponding to the uplink component carrier; or for downlink component carriers corresponding to uplink component carriers which belong to the same uplink component carrier group, the network side transmits an adjustment command on at least one of the downlink component carriers; or for downlink component carriers corresponding to the uplink component carriers, the network side transmits adjustment commands for all or some of the uplink component carriers on one of the downlink component carriers; or for downlink component carriers corresponding to the uplink component carriers, the network side transmits on one of the downlink component carriers adjustment commands for the uplink component carriers except for the one corresponding to the one of the downlink component carriers.

Step 202: the UE determines whether an adjustment command has been received before the TAT expires; if yes, Step 203 is performed; otherwise, step 204 is performed.

Step 203: the UE instructs a physical layer to implement an uplink transmission timing adjustment according to the uplink transmission timing adjustment amount for the uplink component carriers included in the received adjustment command.

In this step, operations executed by the UE include but not limited to:

the UE adjusting the uplink transmission time according to the uplink transmission timing adjustment amount included in the received adjustment command, and resetting the TAT; or the UE adjusting the uplink transmission time according to the uplink transmission timing adjustment amount included in the received adjustment command, and resetting the TAT when a predetermined condition is satisfied.

The resetting the TAT when a predetermined condition is satisfied includes but not limited to:

when the UE has received the information of the uplink transmission timing adjustment amount for all desired uplink component carriers, the UE resetting the TAT; or when the UE has received the information of the uplink transmission timing adjustment amount for a specific uplink component carrier, the UE resetting the TAT; or when the UE has received the information of the uplink transmission timing adjustment amount for a determined number of uplink component carriers, the UE resetting the TAT.

Step 204: the UE executes related operations after the TAT expires.

The related operations include but not limited to: after the TAT expires, the UE determining that the uplink component carriers for which the information of the uplink transmission timing adjustment amount has not been received lose uplink synchronization; or determining that all the uplink component carriers lose uplink synchronization; and after determining that the uplink synchronization is lost, the UE releasing resources corresponding to the uplink component carriers which are determined as losing the uplink synchronization, and initiating a random access to obtain uplink synchronization before uplink transmission. Here, the resources corresponding to the uplink component carriers may be physical uplink control channel resources, pilot signal resources, sounding reference signal (SRS) resources and so on.

Figure 3:
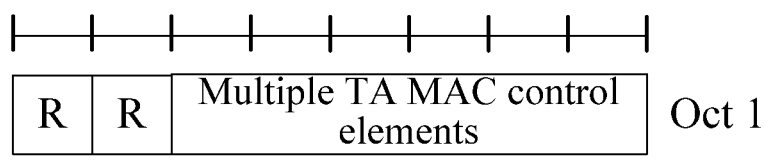
FIG. 3 is a schematic diagram of a TAC format (1) for LTE-A provided in an example of the invention.

A TA MAC CE format for the LTE-A provided in an example of the invention includes the following six types:

Format (1): as shown in FIG. 3, a transmission block (TB) includes multiple TA MAC control elements (CE), and each TA MAC CE corresponds to an uplink component carrier. The original 2-bit reserved bits (in FIG. 3, R is used to represent the reserved bits) in the TA MAC CE are used to indicate numbers of the uplink component carriers and may indicate at most four uplink component carriers.

The LTE-A provides an extended definition of two-bit reserved value to represent number information of the uplink component carrier. The specific meanings are as follows:

TABLE 1

| R bit value | Meanings |
| --- | --- |
| 00 | Representing uplink component carrier with number 0 |
| 01 | Representing uplink component carrier with number 1 |
| 10 | Representing uplink component carrier with number 2 |
| 11 | Representing uplink component carrier with number 3 |

Format (2): each transmission block includes only one TA MAC CE, and the LTE-A redefines a new TA MAC CE format, and the TA adjustment amount is directly represented using an absolute value.

Figure 4:
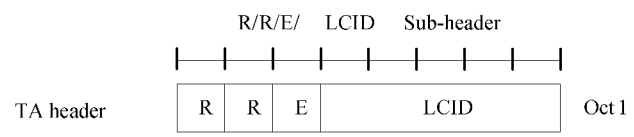
FIG. 4 is a schematic diagram of a TAC format (2) for LTE-A provided in an example of the invention.
Figure 4:
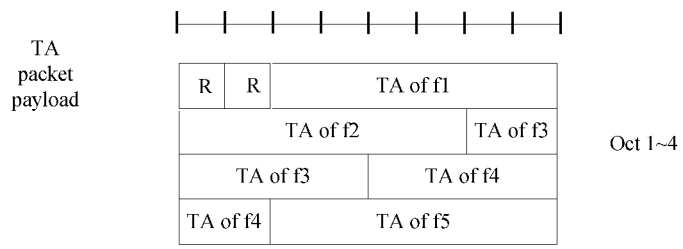

The format of the header and payload is shown in FIG. 4. The format of a TA header is the same as that defined by the LTE except that it needs to extend a new TA LCID. The total length of a TA payload is 4 bits, and may include at most five carriers' uplink TA adjustment. There is 2-bit R where R is the reserved bits.

TA LCID: a timing adjustment command identifier for the LTE-A system.

TA of f1: the TA adjustment amount corresponding to carrier f1.

TA of f2: the TA adjustment amount corresponding to carrier f2.

TA of f3: the TA adjustment amount corresponding to carrier f3.

TA of f4: the TA adjustment amount corresponding to carrier f4.

TA of f5: the TA adjustment amount corresponding to carrier f5.

Figure 5:
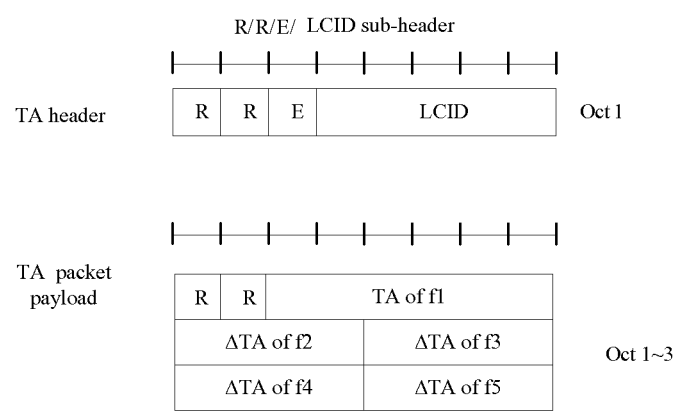
FIG. 5 is a schematic diagram of a TAC format (3) for LTE-A provided in an example of the invention.

Format (3): each transmission block includes only one TA MAC CE, and the LTE-A redefines a new TA MAC CE format. The TA adjustment amount of carrier 1 is an absolute value, and the TA adjustment amounts of other carriers are relative values compared to that of the carrier 1. The format of the TA header is the same as that defined by the LTE except that a new TA LCID is defined. The total length of the TA payload is 3 bits, and may include at most five carriers' uplink TA adjustment. There is 2-bit R where R is the reserved bits. The specific format is shown in FIG. 5:

LCID: a timing adjustment command identifier for the LTE-A system.

TA of f1: the TA adjustment amount corresponding to carrier f1.

ΔTA of f2: the difference between the TA adjustment amount for carrier 2 and that for carrier f1.

ΔTA of f3: the difference between the TA adjustment amount for carrier 3 and that for carrier f1.

ΔTA of f4: the difference between the TA adjustment amount for carrier 4 and that for carrier f1.

ΔTA of f5: the difference between the TA adjustment amount for carrier 5 and that for carrier f1.

Format (4): bitmap plus TA adjustment amount information

In this format, a bitmap is adopted to identity carriers (groups) corresponding to the information of the timing adjustment amount behind. For example, supposing that the length of the bitmap is 5 bits, the value of the bitmap may be set as 00001, then, the information of the timing adjustment amount for the last carrier (group) will be included behind. The value of the bitmap being 01001 indicates that the information of the timing adjustment amount for two carriers (groups) (carrier 2 and carrier 5) will be included behind. Of course, the value of the bitmap may be set as 00000 to indicate that the information of the timing adjustment amount for the corresponding carrier (group) will be included behind, and the value of the bitmap being 01001 indicates that the information of the timing adjustment amount for two carriers (groups) will be included behind.

The relationship between each bit of the bitmap and its corresponding carrier (group) may be in the following manners:

(1) a sequential index based on an order of IDs of various uplink carriers (groups) corresponding to the UE;

(2) a sequential index based on an order of IDs of various downlink carriers (groups) corresponding to the uplink carriers (groups) of the UE;

(3) an order of the carriers (groups) configured for the UE;

(4) indexing according to information of each carrier (group) sent through system broadcasting;

(5) indexing according to an order of the carriers (groups) informed by RRC signalling or MAC signalling or physical layer signalling;

(6) indexing according to other manners which can enable the UE to determine an order of the carriers (groups).

Format (5): carrier (group) index plus TA adjustment amount information

Figure 9:
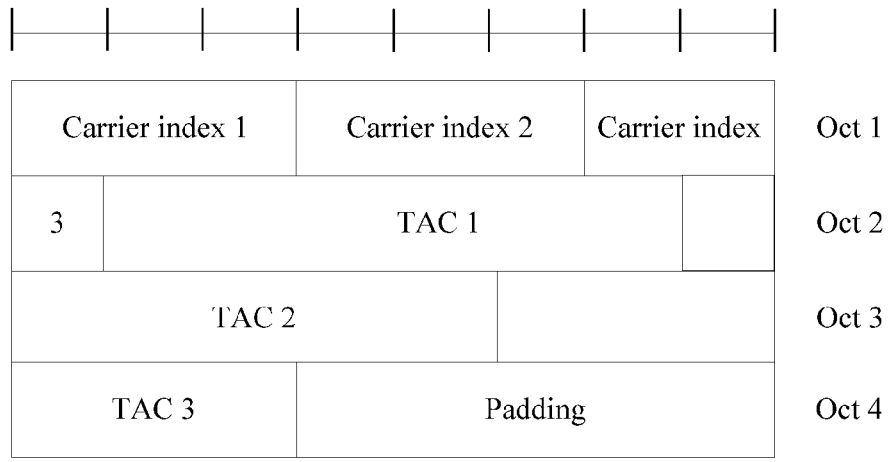
FIG. 9 is a schematic diagram of a TAC format (5) for LTE-A provided in an example of the invention.

This format sends a TA adjustment command for an uplink carrier corresponding to the UE through carrying a carrier index and the information of the timing adjustment amount for the corresponding carrier. For example, the following forms may be adopted: each carrier index is set as occupying three bits, and the TAC corresponding to each carrier occupies six bits. As shown in FIG. 9, the carrier index contained in a MAC CE is first given, and then TAC information of the carrier corresponding to the carrier index is given.

Figure 10:
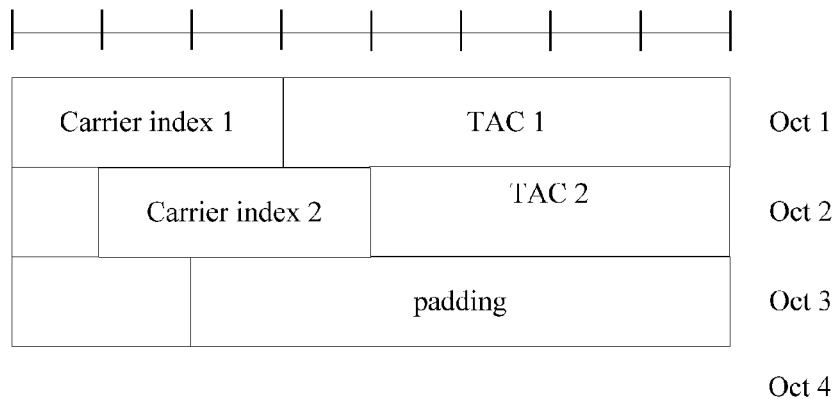
FIG. 10 is a schematic diagram of a TAC format (6) for LTE-A provided in an example of the invention.
Figure 11:
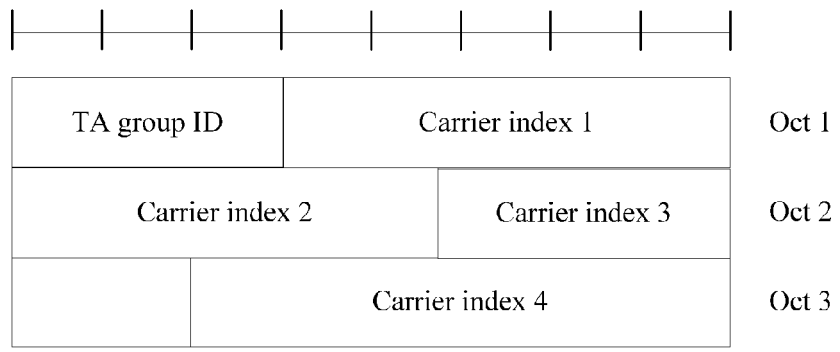
FIG. 11 is a schematic diagram of a MAC CE format 1 for uplink component carrier groups in LTE-A provided in an example of the invention.
Figure 12:
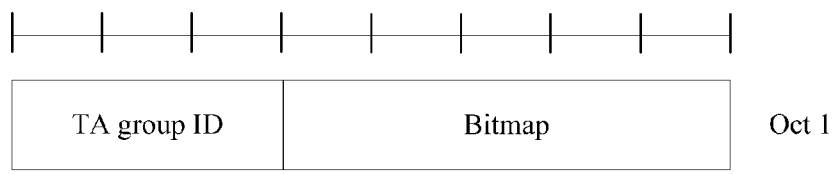
FIG. 12 is a schematic diagram of a MAC CE format 2 for uplink component carrier groups in LTE-A provided in an example of the invention.

Format (6): it is a manner in which TAC contents are added directly behind an index of each carrier (group). An example is shown in FIG. 10.

Of course, in order to facilitate determination of the length of a TA MAC CE, each carrier index and corresponding TAC may occupy an integer number of bytes. If all the bits in a byte cannot be fully occupied, then, the remaining bits may be filled with specified padding bits, the implementation of which is not repeated herein.

The format of the MAC CE for an uplink component carrier group in the LTE-A provided in the example of the invention includes the following two types:

The MAC CE for the uplink component carrier group is used to inform carrier information contained in each uplink component carrier group (TA group).

Format 1: Uplink Component Carrier Group ID Plus Carrier Index

It is set that the uplink component carrier group ID occupies three bits, and the carrier index occupies five bits. An example is given below: the carrier index corresponding to the carriers contained in the uplink component carrier group is behind the uplink component carrier group ID.

Format 2: Uplink Component Carrier Group ID Plus Bitmap

It is set that the uplink component carrier group ID occupies three bits, and the bitmap occupies five bits. Each bit in the bitmap is used to identify which carrier belongs to the uplink component carrier in the carrier information obtained by the UE. For example:

the carrier information obtained by the UE may be:

(1) the carrier which is configured for a user by the network side;

(2) the carrier which is being used by the UE (it can also be called as an active carrier for the user);

(3) the carrier which is informed by system broadcasting, RRC signalling, physical layer signalling or MAC signalling;

When it is desired to inform the UE of a plurality of uplink component carrier groups and the carrier information contained therein, the above format 1 or format 2 may be used in series to inform it. It may also be informed through first giving all uplink component carrier group IDs and the number of the carriers contained there, and then giving specific index values of the carriers corresponding to each uplink component carrier group. The carriers corresponding to the uplink component carrier group may be given by directly giving the index values of the carriers (like format 1) or by adopting the bitmap (like format 2).

Figure 6:
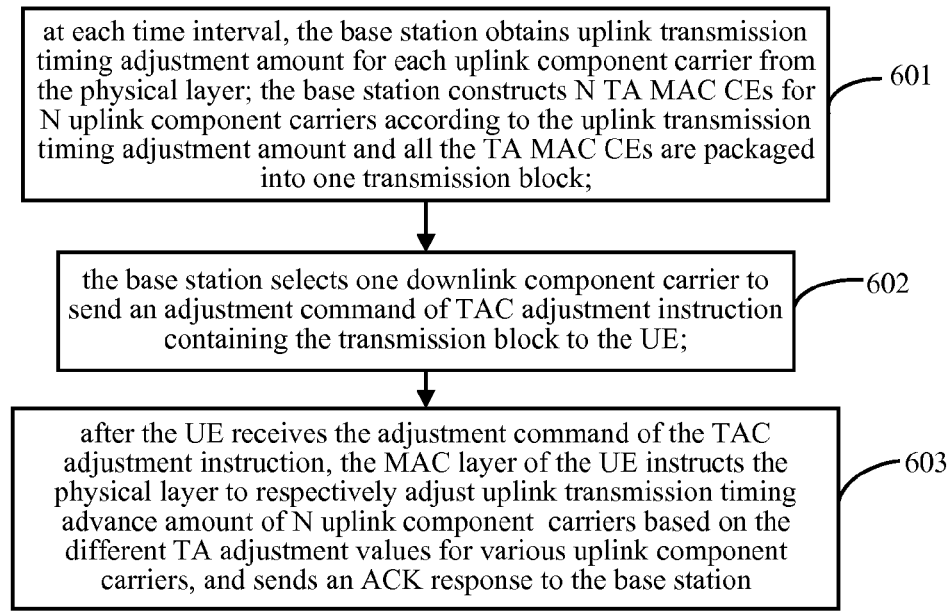
FIG. 6 is a flow chart of an uplink synchronization control in a first example of the invention.

An application scenario for a first example is that: N carriers correspond to N transmitters, and the TAC executes uplink transmission timing adjustment based on carriers. The procedure of an uplink synchronization control is shown in FIG. 6, and includes the following steps:

Step 601: at each time intervals (less than the time of the TAT), the base station obtains uplink transmission timing adjustment amount of each uplink component carrier from the physical layer. According to the uplink transmission timing adjustment amount, the base station constructs N TA MAC CEs for N uplink component carriers based on TA format (1), format (4), format (5) or format (6), or constructs one TA MAC CE based on TA format (2) or format (3), and all the TA MAC CEs are packaged into one transmission block.

Step 602: the base station selects one downlink component carrier to send an adjustment command containing the transmission block to the UE.

Step 603: after the UE receives the adjustment command, the MAC layer of the UE instructs the physical layer to adjust respectively different uplink transmission timing advance of N uplink component carriers based on the different TA amounts of various uplink component carriers, and sends an ACK response to the base station.

Figure 7:
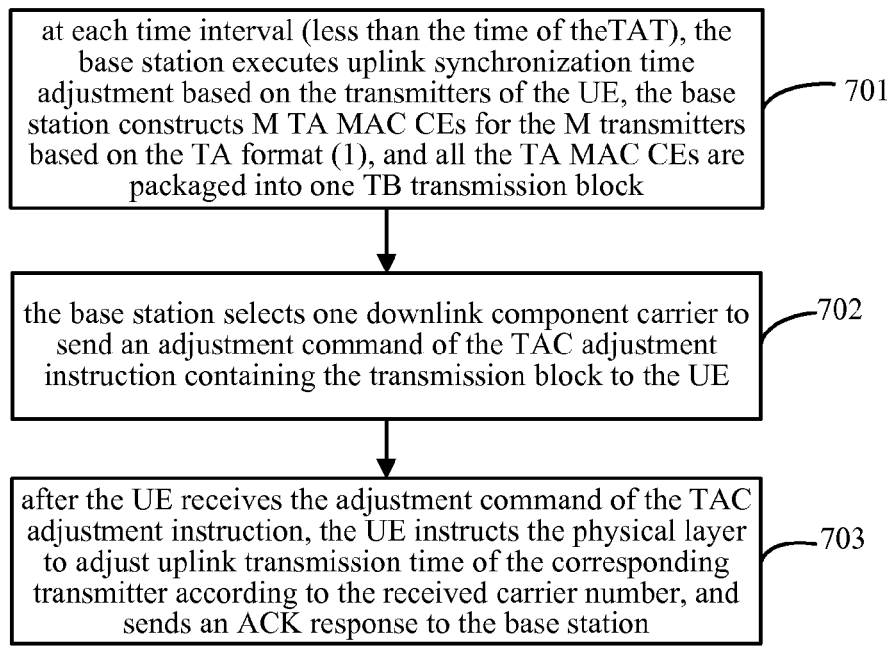
FIG. 7 is a flow chart of an uplink synchronization control in a second example of the invention.

An application scenario for a second example is that: N carriers correspond to M transmitters (N>M), and the base station knows the correspondence relationship between the uplink component carriers of the UE and the transmitters. The TAC executes the TA adjustment based on the transmitters. The process of an uplink synchronization control is shown in FIG. 7, and includes the following steps:

Step 701: at each time interval (less than the time of the TAT), the base station executes uplink synchronization timing adjustment based on the transmitters of the UE.

If a carrier corresponds to a transmitter, then the physical layer of the base station directly measures the carrier; if a plurality of uplink component carriers corresponds to a transmitter, then an average value is obtained by averaging the selected measurements of uplink time of a plurality of uplink component carriers supported by the transmitter, and the obtained average value is regarded as the timing adjustment amount for each uplink component carrier supported by the transmitter with a carrier number of any of the carrier numbers of the plurality of carriers supported by the transmitter. The base station constructs M TA MAC CEs for the M transmitters based on the TA format (1), and all the TA MAC CEs are packaged into one transmission block. For example, carrier f1 and carrier f2 are a continuous carrier aggregation and correspond to one transmitter, then the base station averages the timing adjustment amounts of the carriers f1, f2, and the carrier number of carrier f1 or f2 may be selected as the carrier number of the TA.

Step 702: the base station selects one downlink component carrier to send an adjustment command containing the transmission block to the UE.

Step 703: after the UE receives the adjustment command, the UE instructs the physical layer to adjust uplink transmission time of the corresponding transmitter according to the received carrier number, and sends an ACK response to the base station.

Figure 8:
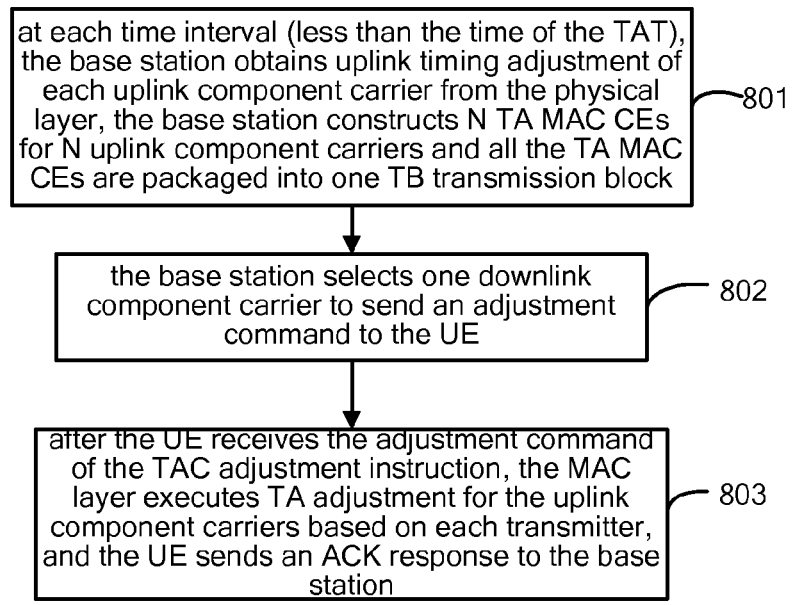
FIG. 8 is a flow chart of an uplink synchronization control in a third example of the invention.

An application scenario for a third example is that: N carriers correspond to M transmitters (N>M), and the base station does not know the correspondence relationship between the UE and the transmitters, and measures based on carriers. The process of an uplink synchronization control is shown in FIG. 8, and includes the following steps:

Step 801: at each time interval (less than the time of the TAT), the base station obtains uplink timing adjustment for each uplink component carrier from the physical layer. The base station constructs N TA MAC CEs for the N uplink component carriers based on TA format (1), or constructs one TA MAC CE based on TA format (2) or format (3), and all the TA MAC CEs are packaged into one transmission block.

Step 802: the base station selects one downlink component carrier to send an adjustment command to the UE.

Step 803: after the UE receives the adjustment command, the MAC layer executes TA adjustment for the uplink component carriers respectively based on the transmitters; if a carrier corresponds to a transmitter, the physical layer is directly instructed to adjust transmission time of the transmitter. If a plurality of uplink component carriers corresponds to a transmitter, the UE selects uplink transmission timing adjustment amounts of a plurality of uplink component carriers supported by the transmitter, makes a weighted average for the selected uplink transmission timing adjustment amounts to obtain a weighted average value, and instructs the transmitter to execute timing adjustment based on the obtained weighted average value. The UE sends an ACK response to the base station.

A fourth example: an obtaining and using procedure of the TA command

Step 1: the network side measures uplink component carriers of the UE, and obtains uplink transmission TA amount for the uplink component carriers.

The network side may measure the uplink component carriers of the UE by:

measuring each uplink component carrier of the UE, or measuring at least one of the uplink component carriers of the UE having the same or similar characteristics, or measuring at least one of the uplink component carriers of the UE belonging to the same characteristic group.

The uplink component carriers which have the same or similar characteristics may have the same or similar channel conditions, or have the same or similar carrier-frequency position, or the like. The uplink component carriers which belong to the same characteristic group is referred to as any of different characteristic groups (or called carrier groups) which are divided by the network side according to contents such as the transmitters, frequency positions among uplink carriers, fading characteristics, TA characteristics and so on corresponding to the uplink carriers which correspond to the UE. The carrier group divided according to the TA characteristics is referred to as an uplink component carrier group (or a common TA set) herein for short. Of course, the name of the carrier group may be varied, for example, the carrier group divided according to the other characteristics may also be referred to as the uplink component carrier group (or the common TA set).

Step 2: the network side transmits to the UE an adjustment command, which includes information of the uplink transmission timing adjustment amount for the uplink component carriers of the UE.

The network side may transmit to the UE the adjustment command through the following manners:

Manner 1: if there is no component carrier group, the information of the uplink transmission timing adjustment amount of the uplink carriers in the adjustment command is maintained for a single carrier, and the network side transmits the adjustment command in one or some of downlink component carriers corresponding to the uplink carriers, which specifically includes that:

(1) the network side, for each uplink component carrier, transmits the adjustment command of the uplink carrier on a downlink component carrier corresponding to the uplink component carrier; or (2) the network side transmits the adjustment command on one or some of downlink component carriers corresponding to the uplink component carriers which belong to the same uplink component carrier group; or (3) the network side transmits the adjustment commands of all the uplink carriers on one of downlink component carriers corresponding to the uplink component carriers; or (4) the network side transmits on one of downlink component carriers corresponding to the uplink component carriers the adjustment commands for the uplink component carriers except for the adjustment command for the uplink component carrier corresponding to the one of the downlink component carriers.

The adjustment command contains the information of the uplink transmission timing adjustment amount for the uplink component carriers of the UE by:

(1) containing the information of the uplink transmission timing adjustment amount for all the uplink component carriers of the UE; or (2) containing the information of the uplink transmission timing adjustment amount for one or some of uplink component carriers of the UE (Note: if there is a carrier group, the information of the adjustment amount herein may be the information of the timing adjustment amount for all the carriers in the carrier group).

Manner 2: maintenance based on component carrier groups

The network side transmits an adjustment command on one or some of downlink component carriers corresponding to the uplink component carriers, which specifically includes:

(1) transmitting on one or some of the downlink component carriers corresponding to one or some uplink component carrier groups, the information of the uplink transmission timing adjustment amount for the uplink component carriers of its own uplink component carrier group and/or other uplink component carrier groups; or (2) transmitting, for each uplink component carrier group, on one or some of downlink component carriers corresponding to the uplink component carrier group the information of the uplink transmission timing adjustment amount for the uplink component carriers in the uplink component carrier group.

The aforementioned information of the uplink transmission timing adjustment amount for the uplink component carriers may be transmitted in the format of any of Format (1) to Format (6).

Further, the information of the uplink transmission timing adjustment amount for the uplink component carrier group may be obtained through transmitting a MAC CE of R8 directly on one component carrier in the same component carrier group, and the other component carriers in the same group automatically adjusting according to the MAC CE.

Step 3: after the UE receives the adjustment command sent by the network side, the UE adjusts data transmission time of the uplink carriers according to the information of the timing adjustment amount contained in the adjustment command.

This will be described in the following in two manners of existing uplink component carrier group and non-existing uplink component carrier group.

If there is no uplink component carrier group existed, each uplink component carrier adjusts transmission time of uplink data according to the information of the transmission timing adjustment amount corresponding to the uplink component carrier sent by the network side. It should be noted that the information of the timing adjustment amount of an uplink component carrier may be obtained through the downlink component carriers corresponding to other uplink component carriers.

If there is an uplink component carrier group existed, each uplink component carrier adjusts transmission time of uplink data on the uplink component carrier according to the information of the transmission time of the uplink data sent by the network side which corresponds to the uplink component carrier group to which the uplink component carrier belongs.

The component carrier group mentioned in the example of the invention, if it is not specified as uplink or downlink, may refer to the uplink component carrier group, the downlink component carrier group or the component carrier group in which there is a binding relationship between the uplink component carriers and the downlink component carriers. When there is the binding relationship between the uplink component carriers and the downlink component carriers, the uplink component carrier group in the example of the invention may also be described in the way of the downlink component carrier group or the component carrier group.

A fifth example: maintenance of TA timer

A TA timer in R10 has the same function as that of the TA timer in R8, and is also used to maintain synchronization of the uplink carriers of the UE. One specific implementation process is as follows:

1. when the TA timer is started or restarted, it starts to monitor update of component carriers corresponding to the UE;

2. when the information of the timing adjustment for all the component carriers corresponding to the UE is received before the TA timer expires, the TA timer is restarted;

3. when the information of the timing adjustment for all the component carriers corresponding to the UE has not been received before the TA timer expires, the UE enters into a process for the timer's expiring.

Further, other processes may also be adopted, for example, when the UE has received the information of the timing adjustment amount for a specific carrier, the timing alignment timer (TAT) is reset; or when the UE has received the information of the timing adjustment amount for a determined number of carriers, the TAT is reset; or when the UE has received the information of the timing adjustment amount, the TAT is reset. As the process is similar, it is not repeated here.

The process for the timer's expiring may be in the following manners:

(1) determining that the uplink component carriers (the component carriers in the uplink component carrier group), for which the information of the timing adjustment amount has not been received, lose uplink synchronization; or (2) determining that all the uplink component carriers lose uplink synchronization;

When component carriers are determined as losing uplink synchronization, operations to be performed may include:

(1) sending a component carrier losing synchronization instruction to a high layer; and (2) releasing resources occupied by the uplink component carriers of the UE which are determined as losing uplink synchronization.

Here, the resources occupied by an uplink component carrier may be: 1) the resources of the physical uplink control channel (PUCCH) corresponding to the uplink component carrier; and 2) the resources of the sounding reference signal (SRS) corresponding to the uplink component carrier.

When the high layer receives the component carrier losing synchronization instruction, operations to be performed may include:

1) initiating an RRC connection re-establishment procedure; and 2) reporting the component carriers losing synchronization to the network side, so that the network side can process the component carriers losing synchronization.

The manners, in which the network side processes the component carriers losing synchronization, may include:

(1) sending information to the UE to instruct it to re-establish uplink synchronization on the component carriers; and (2) sending information to the UE to delete the component carriers from the uplink component carriers corresponding to the UE (it may also delete downlink component carriers corresponding to the uplink component carriers being deleted).

A sixth example: maintenance of the TA timer during the random access on the component carriers The following circumstances may occur in this situation:

(1) an initial configuration procedure from one carrier to multiple carriers;

(2) a random access procedure when uplink data arrive;

(3) a random access procedure when downlink data arrive; and (4) a random access procedure during switching.

In the above situations, there are already component carriers in an uplink synchronization state in the UE, and it is desired to initiate the random access procedure on other component carriers to establish uplink synchronization. At this time, the TA timer may be maintained in the following manners:

(1) the TA timer is maintained in the manner described in the fifth example, and the carrier which initiates the random access is regarded as the carrier which is being used by the UE;

(2) during initiating the random access, the TA timer is restarted, and the subsequent maintenance process is as described in the TA timer maintenance manner of the fifth example, and the carrier which initiates the random access is regarded as the carrier which is being used by the UE;

(3) the information of the timing adjustment amount received in the random access procedure does not affect the TA timer; the TA timer is maintained in the manner described in the fifth example after the random access procedure is completed.

An example of the invention provides a base station which includes:

a measurement module, used to respectively measure uplink component carriers of the UE to obtain information of uplink transmission timing adjustment amount of the uplink component carriers;

a timer module, used to maintain a TAT for the UE; and an adjustment command module, used to generate an adjustment command which contains the uplink transmission timing adjustment amount of the uplink component carriers obtained by the measurement module through measurement before the TAT which is maintained by the timer module expires, and to send the adjustment command to the UE.

The measurement module is used to measure each uplink component carrier of the UE; or in the uplink component carriers of the UE, by the network side measure at least one uplink component carrier which has the same or similar characteristics; or in the uplink component carriers of the UE, by the network side measure at least one uplink component carrier which belongs to the same characteristic group.

The adjustment command module sending the adjustment command to the UE by:

the adjustment command module, for each uplink component carrier, transmitting on a downlink component carrier corresponding to the uplink component carrier the adjustment command of the uplink component carrier; or the adjustment command module transmitting the adjustment command on at least one of the downlink component carriers corresponding to the uplink component carriers belonging to the same uplink component carrier group; or the adjustment command module transmitting the adjustment command of all or some of the uplink component carriers on one of the downlink component carriers corresponding to the uplink component carriers; or the adjustment command module transmitting on one of the downlink component carriers corresponding to uplink component carriers the adjustment command of the uplink component carriers except for the uplink component carrier corresponding to the one of the downlink component carriers.

The measurement module further includes an average unit, where:

when more than two uplink component carriers correspond to a transmitter of the UE, the average unit is used to averaging the uplink transmission timing adjustment amount for the uplink component carriers supported by the transmitter to obtain an average value, and regard the obtained average value as the uplink transmission timing adjustment amount for the uplink component carriers supported by the transmitter.

The adjustment command includes N control elements, and each control element contains an uplink transmission timing adjustment amount for one uplink component carrier.

The adjustment command includes one control element, and each control element contains the uplink transmission timing adjustment amount for N uplink component carriers.

The control element contains an absolute value of the uplink transmission timing adjustment amount for a first uplink component carrier, and a difference between the uplink transmission timing adjustment amount for N−1 uplink component carriers and the uplink transmission timing adjustment amount for the first uplink component carrier.

An example of the invention provides a UE, which includes:

a receiver module, used to receive an adjustment command;

a timer module, to maintain a timing alignment timer (TAT), start or restart the TAT when the receiving module receives the adjustment command; and an uplink adjustment module, to instruct a physical layer to implement uplink transmission timing adjustment according to the uplink transmission timing adjustment amount for the uplink component carriers included in the adjustment command when the receiving module receives the adjustment command before the TAT of the timer module expires.

The timer module includes:

a unit for resetting the TAT when the receiving module receives information of the uplink transmission timing adjustment amount for all the desired uplink component carriers; or a unit for resetting the TAT when the UE has received information of the uplink transmission timing adjustment amount for a specific uplink component carrier; or a unit for resetting the TAT when the UE has received information of the uplink transmission timing adjustment amount for a determined number of uplink component carriers.

The UE further includes: a module for determining that the uplink component carrier for which information of uplink transmission timing adjustment amount has not been obtained loses uplink synchronization if the user equipment has not received the adjustment command when the TAT expires; or a module for determining that all the uplink component carriers lose uplink synchronization if the user equipment has not received the adjustment command when the TAT expires.

The UE further includes: a module for releasing resources corresponding to uplink component carriers which are determined as losing uplink synchronization.

The examples of the present invention define a TAT for each UE, and this can effectively reduce the complexity of the UE's processing. At the same time, the UE and the network side indicate an uplink transmission TA amount for each uplink component carrier, and this can enable accurate adjustment of the uplink synchronization for each uplink component carrier in the carrier aggregation mechanism.

The foregoing is only an example of the present invention and is not for use in limiting the protection scope thereof. All modifications, equivalent replacements or improvements in accordance with the spirit and principles of the present invention shall be included in the protection scope of the present invention.

The invention claimed is:

1. A method for uplink synchronization control, with a network side and a user equipment (UE) maintaining a timing alignment timer (TAT) for the UE, and maintaining an uplink transmission timing adjustment amount for uplink component carriers, and the method comprising:
   the network side respectively measuring uplink component carriers of the UE, and respectively obtaining an uplink transmission timing adjustment amount for the uplink component carriers; and
   before the TAT expires, the network side transmitting to the UE a timing adjustment command comprising at least one of piece of information of the uplink transmission timing adjustment amount for of the uplink component carriers of the UE, wherein each piece of information of the uplink transmission timing adjustment amount corresponds to one uplink component carrier among the uplink component carriers.

2. The method of claim 1, the network side measuring uplink component carriers of the UE comprising:
   the network side measuring each uplink component carrier of the UE; or
   the network side measuring at least one uplink component carrier having the same or similar characteristics among the uplink component carriers of the UE; or
   the network side measuring at least one uplink component carrier belonging to the same characteristic group among the uplink component carriers of the UE.

3. The method of claim 1, the network side transmitting to the UE the timing adjustment command comprising:
   the network side transmitting the timing adjustment command on at least one of downlink component carriers corresponding to the uplink component carriers.

4. The method of claim 3, the network side transmitting the timing adjustment command on at least one of downlink component carriers corresponding to the uplink component carriers comprising:
   for each uplink component carrier, the network side transmitting the timing adjustment command of the uplink component carrier on the downlink component carrier corresponding to the uplink component carrier; or
   the network side transmitting the timing adjustment command on at least one of the downlink component carriers corresponding to the uplink component carriers belonging to the same uplink component carrier group; or
   the network side transmitting the timing adjustment command of all or some of the uplink component carriers on one of the downlink component carriers corresponding to the uplink component carriers; or
   the network side transmitting on one of the downlink component carriers corresponding to the uplink component carriers the timing adjustment command of the uplink component carriers except for the timing adjustment command of the uplink component carrier corresponding to the one of the downlink component carriers.

5. The method of claim 1, wherein after the network side transmitting to the UE the timing adjustment command, the method further comprising:
   the UE adjusting uplink transmission time according to the uplink transmission timing adjustment amount in the received timing adjustment command, and resetting the TAT; or
   the UE adjusting uplink transmission time according to the uplink transmission timing adjustment amount in the received timing adjustment command, and resetting the TAT when a predetermined condition is satisfied.

6. The method of claim 5, the resetting the TAT when a predetermined condition is satisfied comprising:
the UE resetting the TAT when the UE has received the information of the uplink transmission timing adjustment amount for all desired uplink component carriers, a specific uplink component carrier, or a determined number of uplink component carriers.

7. The method of claim 1, the method further comprising:
if the UE has not received the timing adjustment command when the TAT expires, the UE determining that the uplink component carrier for which the information of the uplink transmission timing adjustment amount has not been obtained loses uplink synchronization, or determining that all the uplink component carriers lose uplink synchronization.

8. The method of claim 1, wherein if the number N of uplink component carriers of the UE is larger than the number M of transmitters of the UE, the network side measuring the uplink component carriers of the UE comprising:
for a transmitter corresponding to more than two uplink component carriers, the network side averaging the uplink transmission timing adjustment amount for the uplink component carriers supported by the transmitter to obtain an average value, and regarding the average value as the uplink transmission timing adjustment amount for the uplink component carriers supported by the transmitter.

9. The method of claim 8, the timing adjustment command comprising one or more control elements wherein
when the timing adjustment command comprises more than one control element respectively corresponding to the uplink component carriers, each control element comprises the uplink transmission timing adjustment amount for one uplink component carrier; and
when the timing adjustment command comprises one control element, the one control element comprises the uplink transmission timing adjustment amount for the uplink component carriers.

10. The method of claim 8, when the timing adjustment command comprises one control element, the control element comprising an absolute value of the uplink transmission timing adjustment amount for a first uplink component carrier, and a difference between the uplink transmission timing adjustment amount for the other uplink component carriers and the uplink transmission timing adjustment amount for the first uplink component carrier.

11. A method for uplink synchronization control, with a network side and a user equipment (UE) maintaining a timing alignment timer (TAT) for the UE, and maintaining an uplink transmission timing adjustment amount for uplink component carriers, and the method comprising:
when the UE receives a timing adjustment command before the TAT expires, the UE instructing a physical layer to implement uplink transmission timing adjustment according to at least one of pieces of information of the uplink transmission timing adjustment amount for the uplink component carriers comprised in the timing adjustment command, and resetting the TAT when a predetermined condition is satisfied, wherein each piece of information of the uplink transmission timing adjustment amount corresponds to one uplink component carrier among the uplink component carriers.

12. The method of claim 11, the method further comprising: when the UE has not received the timing adjustment command before the TAT expires, the UE initiating a random access to obtain uplink synchronization before uplink transmission and releasing physical uplink control channel resources and pilot signal resources.

13. The method of claim 11 when the number of uplink component carriers of the UE is larger than the number of transmitters of the UE, the UE instructing the physical layer to implement the uplink transmission timing adjustment according to the uplink transmission timing adjustment amount for the uplink component carriers comprised in the timing adjustment command by:
for a transmitter corresponding to more than two uplink component carriers, the UE averaging the uplink transmission timing adjustment amount for the uplink component carriers supported by the transmitter to obtain an average value, and instructing the transmitter to implement the uplink transmission timing adjustment according to the average value.

14. A computer-implemented base station, comprising:
a measurement module, to respectively measure uplink component carriers of a user equipment (UE) to respectively obtain uplink transmission timing adjustment amount of the uplink component carriers;
a timer module, to maintain a timing alignment timer (TAT) for the UE; and
an adjustment command module, to generate a timing adjustment command which comprises at least one of piece of information of the uplink transmission timing adjustment amount of the uplink component carriers obtained by the measurement module through measurement before the TAT maintained by the timer module expires, and to send the timing adjustment command to the UE, wherein each piece of information of the uplink transmission timing adjustment amount corresponds to one uplink component carrier among the uplink component carriers.

15. The base station of claim 14, the measurement module being to:
measure each uplink component carrier of the UE; or
measure at least one uplink component carrier having the same or similar characteristics among the uplink component carriers of the UE; or
measure at least one uplink component carrier belonging to the same characteristic group among the uplink component carriers of the UE.

16. The base station of claim 14, the adjustment command module sending the timing adjustment command to the UE by:
for each uplink component carrier, transmitting the timing adjustment command of the uplink component carrier on the downlink component carrier corresponding to the uplink component carrier; or
transmitting the timing adjustment command on at least one of the downlink component carriers corresponding to the uplink component carriers belonging to the same uplink component carrier group; or
transmitting the timing adjustment command of all or some of the uplink component carriers on one of the downlink component carriers corresponding to the uplink component carriers; or
transmitting on one of the downlink component carriers corresponding to the uplink component carriers the timing adjustment command of the uplink component carriers except for the timing adjustment command of the uplink component carrier corresponding to the one of the downlink component carriers.

17. The base station of claim 14, the measurement module further comprises an average unit;

when more than two uplink component carriers correspond to a transmitter of the UE, the average unit being to averaging the uplink transmission timing adjustment amount for the uplink component carriers supported by the transmitter to obtain an average value, and regard the obtained average value as the uplink transmission timing adjustment amount for the uplink component carriers supported by the transmitter.

18. A computer-implemented user equipment, comprising:
a receiving module, to receive a timing adjustment command;
a timer module, to maintain a timing alignment timer (TAT), start or restart the TAT when the receiving module receives the timing adjustment command; and
an uplink adjustment module, to instruct a physical layer to implement uplink transmission timing adjustment according to uplink transmission timing adjustment amount for at least one of piece of information of the uplink component carriers comprised in the timing adjustment command when the receiving module receives the timing adjustment command before the TAT of the timer module expires, wherein each piece of information of the uplink transmission timing adjustment amount corresponds to one uplink component carrier among the uplink component carriers.

19. The user equipment of claim 18, the timer module comprising:
a unit for resetting the TAT when the receiving module has received information of the uplink transmission timing adjustment amount for all the desired uplink component carriers; or
a unit for resetting the TAT when the receiving module has received information of the uplink transmission timing adjustment amount for a specific uplink component carrier; or
a unit for resetting the TAT when the receiving module has received information of the uplink transmission timing adjustment amount for a determined number of uplink component carriers.

20. The user equipment of claim 18, further comprising: a module for determining that the uplink component carrier for which information of uplink transmission timing adjustment amount has not been obtained loses uplink synchronization if the user equipment has not received the timing adjustment command when the TAT expires; or a module for determining that all the uplink component carriers lose uplink synchronization if the user equipment has not received the timing adjustment command when the TAT expires.

* * * * *